US009973806B2

(12) United States Patent
Tsiridis et al.

(10) Patent No.: US 9,973,806 B2
(45) Date of Patent: *May 15, 2018

(54) METHOD AND AN ELECTRONIC DEVICE FOR PLAYBACK OF VIDEO

(71) Applicant: SPOTIFY AB, Stockholm (SE)

(72) Inventors: Theodoros Tsiridis, Stockholm (SE); Daniel Fleming, Brooklyn, NY (US); Tobias van Schneider, Brooklyn, NY (US)

(73) Assignee: SPOTIFY AB, Stockholm (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/412,792

(22) Filed: Jan. 23, 2017

(65) Prior Publication Data

US 2017/0134795 A1 May 11, 2017

Related U.S. Application Data

(63) Continuation of application No. 14/927,273, filed on Oct. 29, 2015, now Pat. No. 9,554,186.

(60) Provisional application No. 62/072,153, filed on Oct. 29, 2014.

(51) Int. Cl.
| | |
|---|---|
| *G06F 3/00* | (2006.01) |
| *H04N 21/431* | (2011.01) |
| *H04N 21/433* | (2011.01) |
| *H04N 21/472* | (2011.01) |
| *H04N 21/81* | (2011.01) |

(52) U.S. Cl.
CPC ....... *H04N 21/4312* (2013.01); *H04N 21/433* (2013.01); *H04N 21/472* (2013.01); *H04N 21/8153* (2013.01)

(58) Field of Classification Search
CPC .......... H04N 21/4424; H04N 21/4312; H04N 21/433; H04N 21/472; H04N 21/8163
USPC ........................................................ 725/41
See application file for complete search history.

(56) References Cited

U.S. PATENT DOCUMENTS

| | | | | |
|---|---|---|---|---|
| 7,607,150 B1 * | 10/2009 | Kobayashi | ............ | G06F 3/0482 348/206 |
| 2007/0266398 A1 * | 11/2007 | Vandaele | ........... | H04N 7/17318 725/38 |
| 2009/0322962 A1 * | 12/2009 | Weeks | ............... | H04N 7/17318 348/726 |

* cited by examiner

*Primary Examiner* — Nathan Flynn
*Assistant Examiner* — Alfonso Castro
(74) *Attorney, Agent, or Firm* — Tucker Ellis LLP

(57) ABSTRACT

The present disclosure relates to streaming of media content. In one example embodiment, an electronic device for playing video content may comprise a user interface, a processor and a memory. The memory may comprise computer program code, which, when run in the processor causes the electronic device to receive a first request to play first video content associated with a first video stream at the user interface, and in response to receiving the first request, pre-buffer data related to the first video stream; while pre-buffering this data and before playing the first video content at the user interface; display (at the user interface) a still image corresponding to a portion of the first video content in a first video tile at a first size; and re-size the first size to a second size such that a zooming-out effect of the displayed still image is provided.

18 Claims, 16 Drawing Sheets

METHOD AND AN ELECTRONIC DEVICE FOR PLAYBACK OF VIDEO

CLAIM OF PRIORITY

This application is a continuation of U.S. Patent Application titled "A METHOD AND AN ELECTRONIC DEVICE FOR PLAYBACK OF VIDEO", application Ser. No. 14/927,273, filed Oct. 29, 2015, subsequently issued as U.S. Pat. No. 9,554,186 on Jan. 24, 2017; which claims the benefit of priority to U.S. Provisional Patent Application titled "A METHOD AND AN ELECTRONIC DEVICE FOR PLAYBACK OF VIDEO", Application No. 62/072,153", filed Oct. 29, 2014; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to the providing of media content, and more particularly the providing of video content. In particular, the embodiments of the present invention relate to methods of operating an electronic device and corresponding electronic devices for playback of video content.

BACKGROUND

As computer technology has improved, the digital media industry has evolved greatly in recent years. Users are able to use electronic devices (e.g., smart phones, tablet computers, etc.) to consume music, video and other forms of media content. For instance, users can listen to audio content (e.g., music) or watch video content on a variety of electronic devices. At the same time, advances in network technology have increased the speed and reliability with which information can be transmitted over computer networks. It is therefore possible for users to stream media content over computer networks as needed, or on demand, rather than transmitting a complete file in physical media (such as CD or DVD, or downloading the entire file) before consuming the media content.

SUMMARY

Despite the advances in computer network speed and reliability, some existing solutions for streaming media content may involve relatively long loading times. This may e.g. be particularly true when transitioning, or switching, between media streams on a wireless network (or other low bandwidth network) that does not have sufficient bandwidth to simultaneously receive high bandwidth versions of large number of media streams. For example, if a user attempts to scan through several video streams (e.g., channel surfing through various television channels), the user may experience frequent breaks to load content. In turn, this may degrade the user experience. It is in view of these considerations and others that the various embodiments of the present invention have been made.

Accordingly, it is a general object of the embodiments of the present invention to allow for the required loading times and, at the same time, provide an uninterrupted user experience when watching video content.

According to a first aspect, a method of operating an electronic device for playback of video content is provided. The method according to the first aspect comprises: receiving a first request to play first video content associated with a first video stream at a user interface of the electronic device, in response to receiving the first request, pre-buffering data related to the first video stream; while pre-buffering said data and before playing the first video content at the user interface; displaying, at the user interface, a still image corresponding to a portion of the first video content in a first video tile at a first size, and adjusting the first size to a second size to provide an effect of one of a zooming-out or zooming-in of the displayed still image.

According to a second aspect, a method of operating an electronic device for playback of video content is provided. The method according to the second aspect comprises: receiving a first request to play first video content associated with a first video stream at a user interface of the electronic device, wherein the first video stream corresponds to a first channel of a sequence of several channels; in response to receiving the first request, playing the first video content associated with the first video stream at the user interface; while playing the first video content at the user interface, receiving a second request to play second video content associated with a second video stream at the user interface, wherein the second video stream corresponds to a second channel of the sequence of several channels; in response to receiving the second request, pre-buffering data related to the second video stream; while pre-buffering said data and before playing the second video content at the user interface; displaying, at the user interface, a still image corresponding to a portion of the second video content in a second video tile at a first size, and adjusting the first size to a second size to provide an effect of one of a zooming-out or zooming-in of the displayed still image.

According to a third aspect, there is provided an electronic device for playback of video content which is configured to execute, or otherwise perform, the method of the first aspect.

According to a fourth aspect, there is provided an electronic device for playback of video content which is configured to execute, or otherwise perform, the method of the second aspect.

According to a fifth aspect, there is provided a computer readable storage medium encoded with instructions that, when executed on a processor, performs the method according to any one or both of the first and second aspects.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

Figure 1:
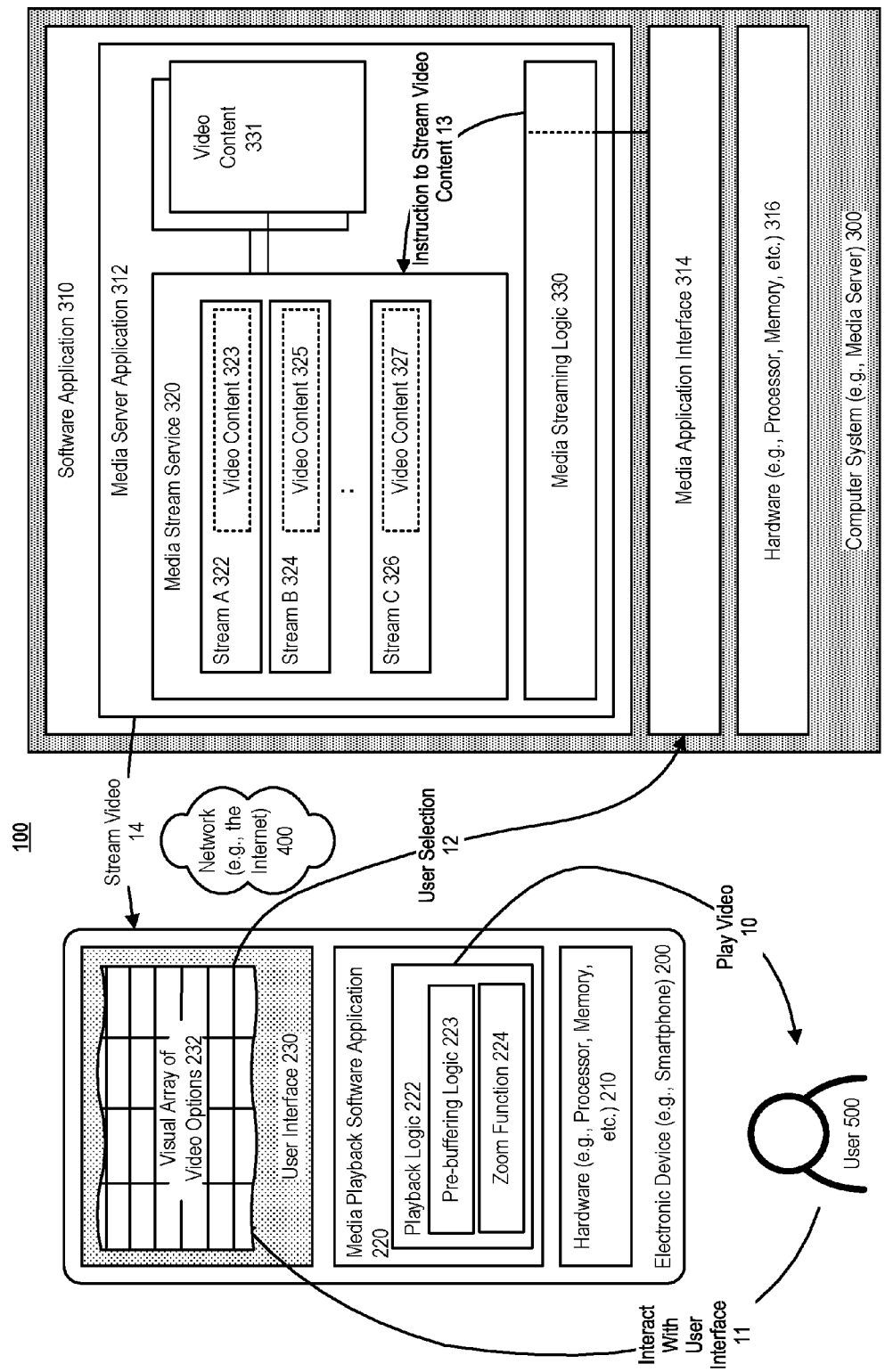
FIG. 1 illustrates a system for playback of video content, in accordance with an embodiment.

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements throughout the description.

As described above, some existing solutions for streaming media content may involve relatively long loading times. This may, e.g., be particularly true when transitioning, or switching, between media streams on a wireless network (or other low bandwidth network) that does not have sufficient bandwidth to simultaneously receive high bandwidth versions of large number of media streams. For example, if a user attempts to scan through several video streams (e.g., channel surfing through various television channels), the user may experience frequent breaks to load content. This may degrade the user experience.

It is therefore a general object of at least some of the embodiments described herein to allow for the required loading times and, simultaneously, provide for an uninterrupted user experience, i.e. a user experience that (from the user's perception) seems immediate.

To address this, in accordance with an embodiment, described herein is an electronic device and a method of operating the electronic device for playback of video content. A request to play first video content associated with a video stream at a user interface of the electronic device is received by the electronic device. In response to receiving the first request, the electronic device pre-buffers data related to the first video stream. While this data is being pre-buffered by the electronic device and before the first video content is played at the user interface of the electronic device, a still image corresponding to a portion of the first video content is displayed at the user interface. The still image is displayed in a first video tile at a first size and, furthermore, this first size is adjusted to a second size to provide an effect of one of a zooming-out or zooming-in of the displayed still image.

The provision of a zooming-out effect (or, zooming-in effect) of a still image corresponding to a portion of the first video content allow for the required loading times and, simultaneously, allow for an uninterrupted user experience. The described approach recognizes that a zooming-out appearance of the still image has the psychological effect that the users will perceive the zoomed-out appearance of the still image as if the video content is being played back at the user interface immediately. In other words, from the user's perception the playing back of the video content seems immediate. Also, since sufficient data may be pre-buffered while the zoomed-out appearance of the still image is displayed unnecessary breaks, or interruptions, to load video content may be avoided and so, the user experience when consuming video content may be improved.

FIG. 1 illustrates a system 100 for playback of media content, in accordance with an example embodiment. The system 100 may comprise an electronic device 200 and a computer system 300 operating as a media server. The electronic device 200 may be communicatively connectable to the computer system 300 via a network 400, such as the Internet, as is conventional and known in the existing art. As can be seen in FIG. 1, only a single electronic device 200 and a single computer system 300 are shown. However, the computer system 300 may support the simultaneous use of multiple electronic devices, and/or the electronic device 200 can simultaneously access video content at multiple computer systems.

In the following description, the media content will be exemplified to be video content so as not to obscure the description of the embodiments disclosed herein with unnecessary detail. This should, however, not be interpreted as limiting the scope of the various embodiments of the invention.

As shown in FIG. 1, the electronic device 200 may be used for the playback of video content, which is provided by the computer system 300. The electronic device 200 may be a mobile telephone, such as a smart phone. Alternatively, the electronic device 200 may be a tablet computer. In yet other embodiments, the electronic device 200 may be any other electronic device capable of playback of media content such as, for example, one of the electronic devices of the following group: a personal computer, a laptop, and a mobile electronic device (e.g. a handheld entertainment device, a digital media player, or other media device).

The electronic device 200 may include one or several physical computer resources, or hardware resources 210. Likewise, the computer system 300 operating as a media server may include one or several physical computer resources, or hardware resources 316.

The computer system 300 may include an operating system or other processing system which supports execution of a software application 310, including a media server application 312 which may be used, for example, to stream video content. A media stream service 320 may be used to buffer video content, for streaming to one or more video streams 322, 324, 326. A media application interface 314 may receive requests from electronic devices 200 or other systems, to retrieve video content 331 from the computer system 300.

Video content or items 331 may be provided, for example, within a database or repository, or may be received by the computer system 300 from another source (not shown). This another source (not shown) may be external to the computer system 300, i.e. it may be located remotely from the computer system 300.

A media streaming logic 330 may be used to retrieve or otherwise access the video content 331 in response to requests from electronic devices 200 or other systems, and populate the video stream service with streams 322, 324, 326 of corresponding video content data 323, 325, 327 that may be returned to the requesting electronic device 200.

In some embodiments, the electronic device 200 comprises a user interface 230, which is adapted to display or otherwise provide a visual array of video options 232, for example as a two-dimensional grid, a list, or other visual array format, and determine a user input. Each video option in the visual array of video options 232 correspond to a respective video stream 322, 324, 326. Examples of various visual arrays 232 are described in further detail below.

Selecting a particular video option within the visual array 232 may be used, or otherwise interpreted, as a request or instruction to the media server application 312 to stream or otherwise return a corresponding particular item of video content. For example, in accordance with some embodiments, the software application 310 at the computer system 300 may be used to stream or otherwise communicate video content to the electronic device 200, wherein the user interface 230 at the electronic device 200 is adapted to display a plurality of video options that correspond to respective video streams.

In accordance with some embodiments, the electronic device 200 may also include a media playback application 220, together with a playback logic 222, pre-buffering logic 223, and a zoom function 224, which may be used to control the playback of video content that is received from the media server application 312, for playback by the electronic device 200, as described in further detail below. The pre-buffering logic 223 enables a portion of each video content, or item, to be pre-buffered at the electronic device 200, as decided by the playback logic 222. For example, while video streams are being prepared for playback, their related video content may be pre-buffered at the same time, allowing for a playback experience that, from the user's perception, seems immediate.

A user 500 may interact 11 with the user interface 230 and issue requests, for example the playing of a selected video content on the electronic device 200. The user's selection of a particular video option (or, stream) may be communicated 12 to the media server application 312, via the media application interface 314. The media server application 312 may then be instructed 13 to stream corresponding video content 13, including one or more streams of video content data 323, 325, 327, and subsequently stream 14 or otherwise communicate the, e.g., selected video, to the user's electronic device 200. In accordance with some embodiments, pre-buffering requests from the electronic device 200 may also be communicated to the media server application 312 via the media application interface 314. At the electronic device 200, in response to the user's interaction with the user interface 230, the media playback application 220, including the playback logic 222, may play 10 the requested video content to the user 500, for example by playing back a video on the electronic device 200, as described in further detail below.

Figure 2:
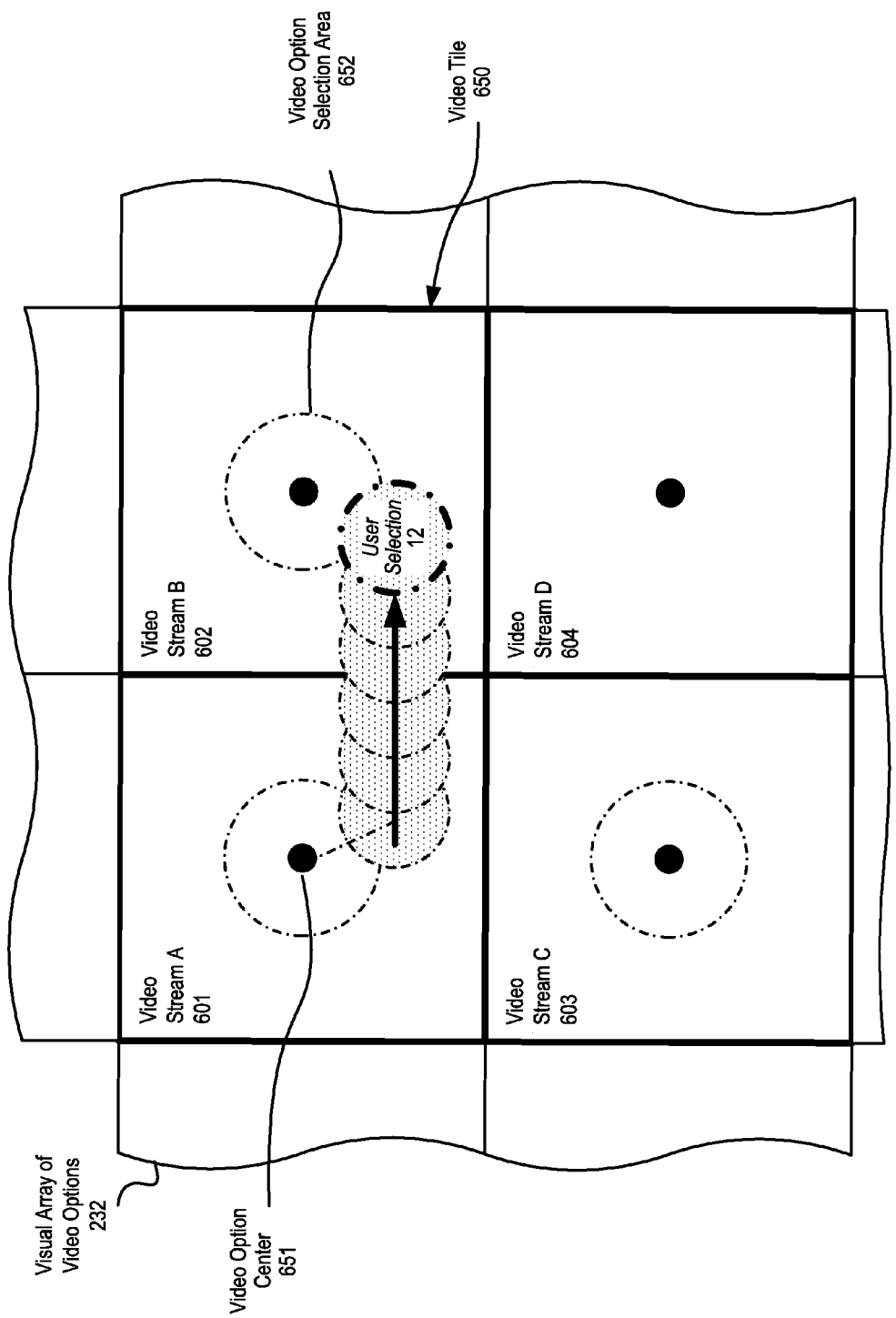
FIG. 2 illustrates an example of a playback of video content, in accordance with an embodiment.

FIG. 2 illustrates an example of a visual appearance of the visual array of video options/streams 232 displayed at the user interface 230 of the electronic device 200 of FIG. 1. As illustrated in FIG. 2, in the example shown therein, four video streams A (601), B (602), C (603) and D (604) are visualized as video tiles 650. As used herein, a video tile 650 means a region of the user interface 230 that displays video content corresponding to a video stream 601, 602, 603, 604 (e.g., a still image of video content, playing the video content, or the like). Each video tile 650 has a respective video option center 651 (illustrated in the figure as a point) and a video selection area 652. Depending on the particular implementation, the video selection area 652 may be a comparatively smaller area compared with the whole area of the video tile 650. However, in some implementations the whole video tile area make up the video selection area 652, i.e. the video tile area equals the video selection area 652.

In accordance with an embodiment, a plurality of video options/streams may e.g. be represented at the user interface 230 as a two-dimensional visual array. The plurality of video options may e.g. be provided as an array of video tiles 650. Each video tile 650 may be associated with a particular visualization identifying a represented video or channel (e.g. a television channel). The particular visualization identifying the represented video, or channel, may for example be a still image of the represented video, or channel. In some embodiments, supplementary forms of visualization may be used to complement the above-mentioned still image of the represented video or channel. For example, a text (such as a title of the represented video or television channel) or another label may be provided in a semi-transparent manner such that the text appears as text overlaying the still image.

While a selected point, or region, is moved within the grid of video options (i.e. video streams A (601), B (602), C (603), D (604)), the visualization, or appearance, of those video options that are proximate to the selected point or region may optionally be modified, for example by varying their respective opacity. For example, in accordance with an embodiment, the opacity of a particular point or region, including the closest video tile and/or proximate video tiles may be modified to render the closest or proximate video options to a selected point or region in a more visible manner than other (not selected, or not proximate) video tiles.

In accordance with an embodiment, a user 500 may provide input as a user selection of a point or region 12. As will be appreciated, the user interface 140 may advantageously be a touch-sensitive user interface, which recognizes input in the form of a touch, for example the position of a user's finger (or a stylus) upon the user interface 230, to determine the selected point or region within the visual array of video options 232. Similarly, the user interface 230 may determine the selected point or region 12 as it is being moved, in response to a user input, within the visual array of video options 232. Although a touch-sensitive user interface is described as particularly advantageous, those skilled in the art will appreciate that other user interfaces are possible too. For example, in the case of a mouse-based interface, the input can be provided by a mouse-down event. Alternatively, the user interface could be a motion detection based interface. Motion detection based interfaces detects a motion of an object (e.g. movement of a user's hand) and converts the detected motion into input useable by the electronic device 200.

Figure 3A:
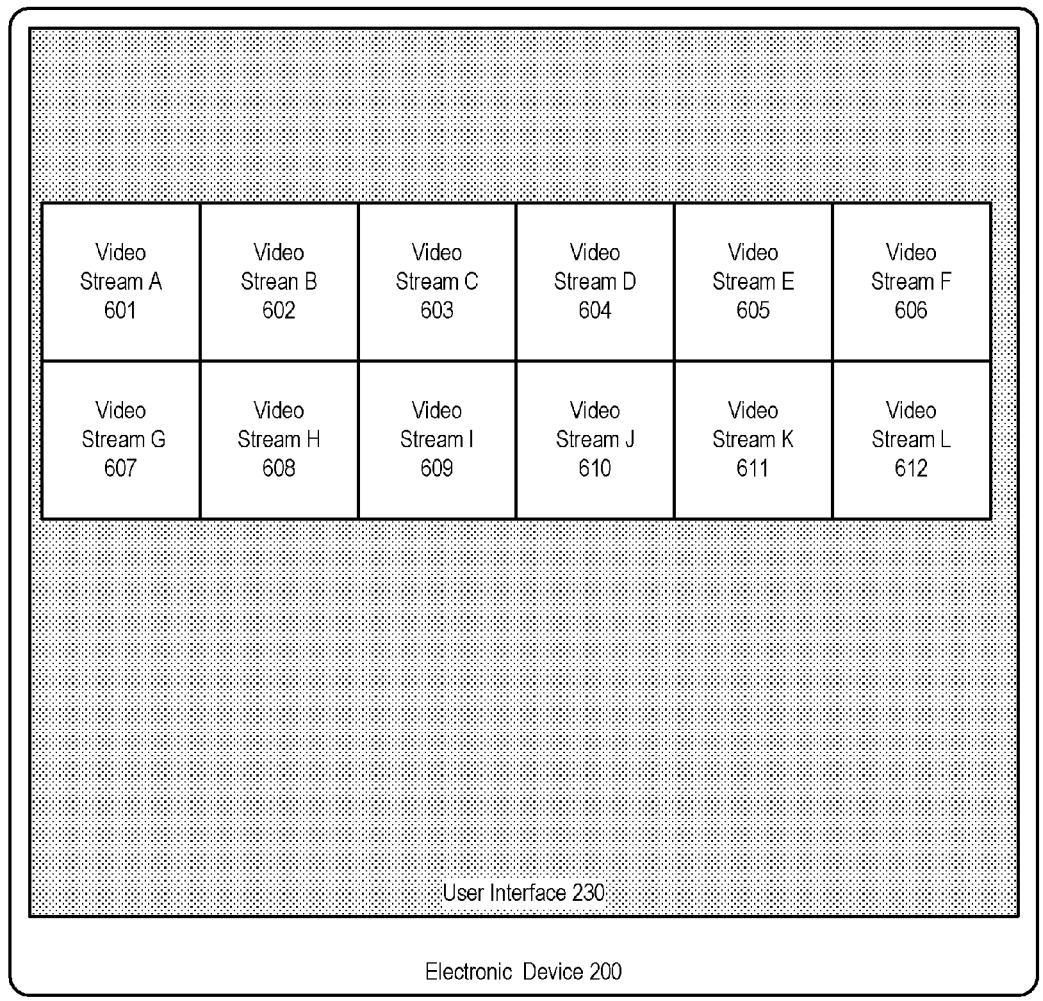
FIGS. 3A-3D illustrate an example of a user interface which supports playback of video content in accordance with an embodiment.
Figure 3B:
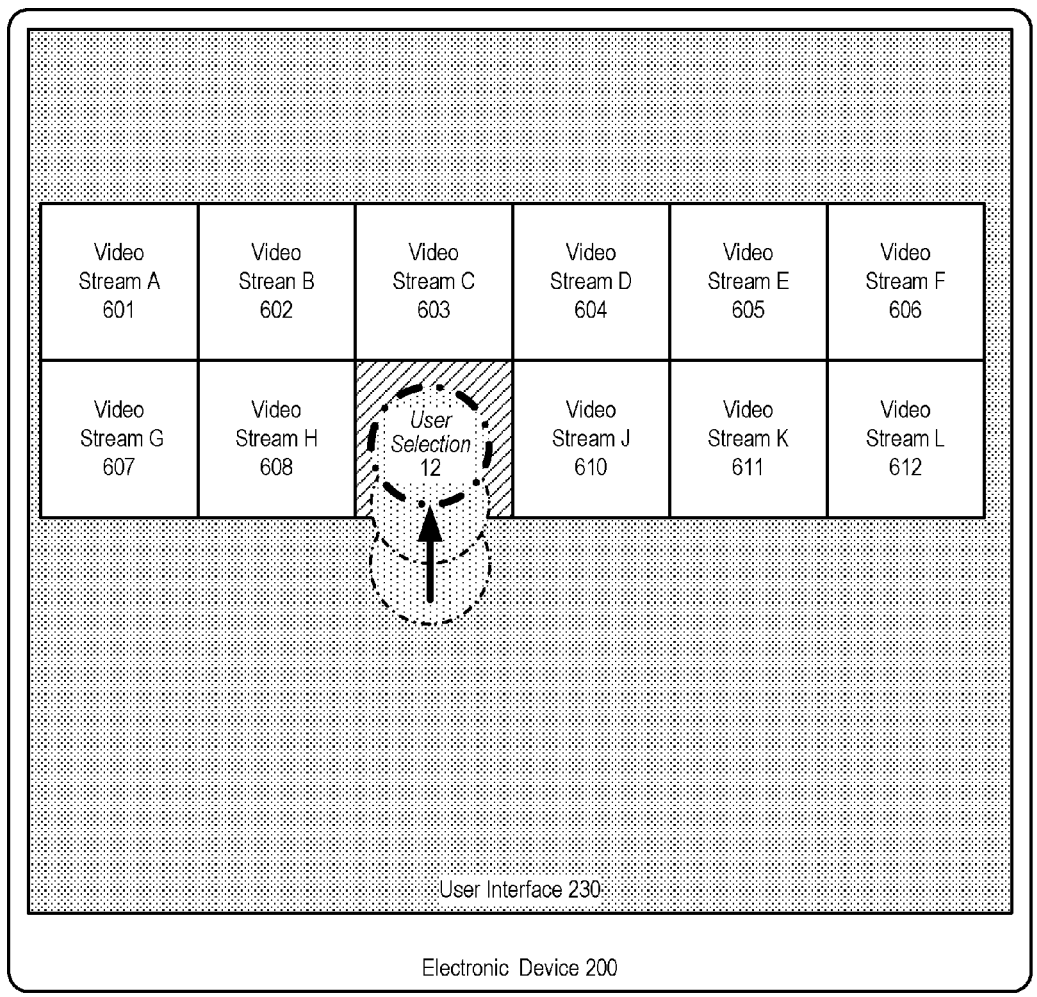
Figure 3C:
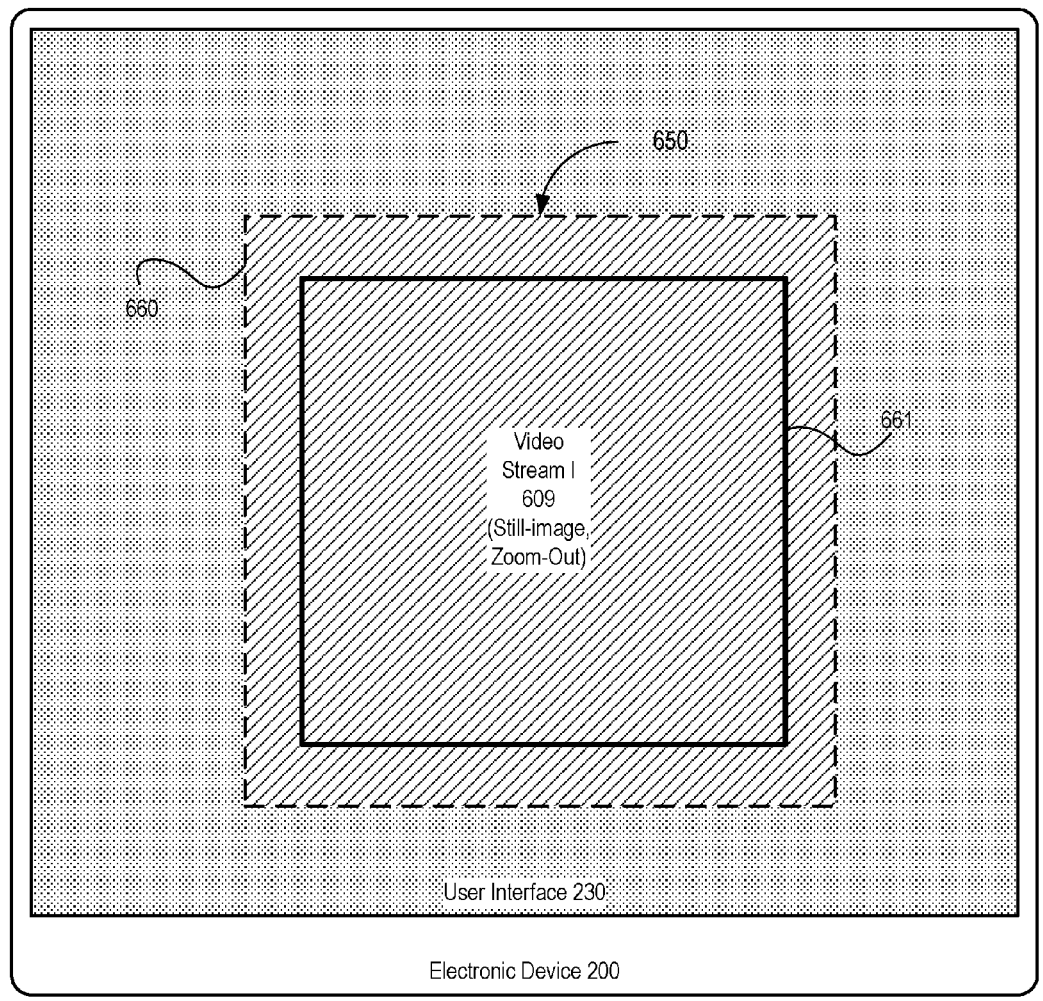

FIGS. 3A-3D illustrate an electronic device 200 with an exemplary user interface which supports playback of video content, in accordance with an embodiment. In an example embodiment, such as in the example illustrated in FIGS. 3A-3D, upon a user selection 12 of video stream I (609), the electronic device 200 receives a request, or instruction, to play video content associated with the video stream I (609) at the user interface 230 of the electronic device 200. In response to receiving this request, the pre-buffering logic 223 of the playback logic 222 starts pre-buffering data related to the selected video stream, i.e. video stream I (609) in this example. With reference to FIG. 3C, while the above-mentioned data is being pre-buffered and before the selected video content is played at the user interface 230, a still image corresponding to a portion of the selected video content (i.e. a portion of video stream I (609) in this example) is displayed in a video tile 650 at a first size 660. Also, this first size 660 is adjusted or re-sized to another, second, size 661 by means of zoom function 224 such that a zooming-out effect (or, alternatively a zooming-in effect) of the displayed still image is provided. In accordance with an embodiment, during a zooming-out, while the image is reduced in size, it can be simultaneously padded with additional image portions so that it continues to fill the video tile area; similarly, during a zooming-in, while the image is increased in size, it can be simultaneously cropped, so that it continues to fill the video tile area. The zoomed-out version of the still image is thus displayed within the video tile 650 while data related to the selected video stream 609 is being pre-buffered.

As mentioned hereinabove, the still image may correspond to a portion of the selected video content. This portion of the selected video content may be pre-defined for the selected video content, such that a certain portion of the video content is always selected upon a user selection of the same video content. In other words, the selection of still image may be static. Alternatively, the portion of the selected video content may be dynamically selected. For example, if the video content is associated with a live video stream of (e.g., a live soccer game) it may be more user-friendly if the still image corresponds to a portion of the live video stream. In some embodiments, it may be pre-configured that a portion which appears at a certain timing of the video stream should be selected for the still image.

Figure 3D:
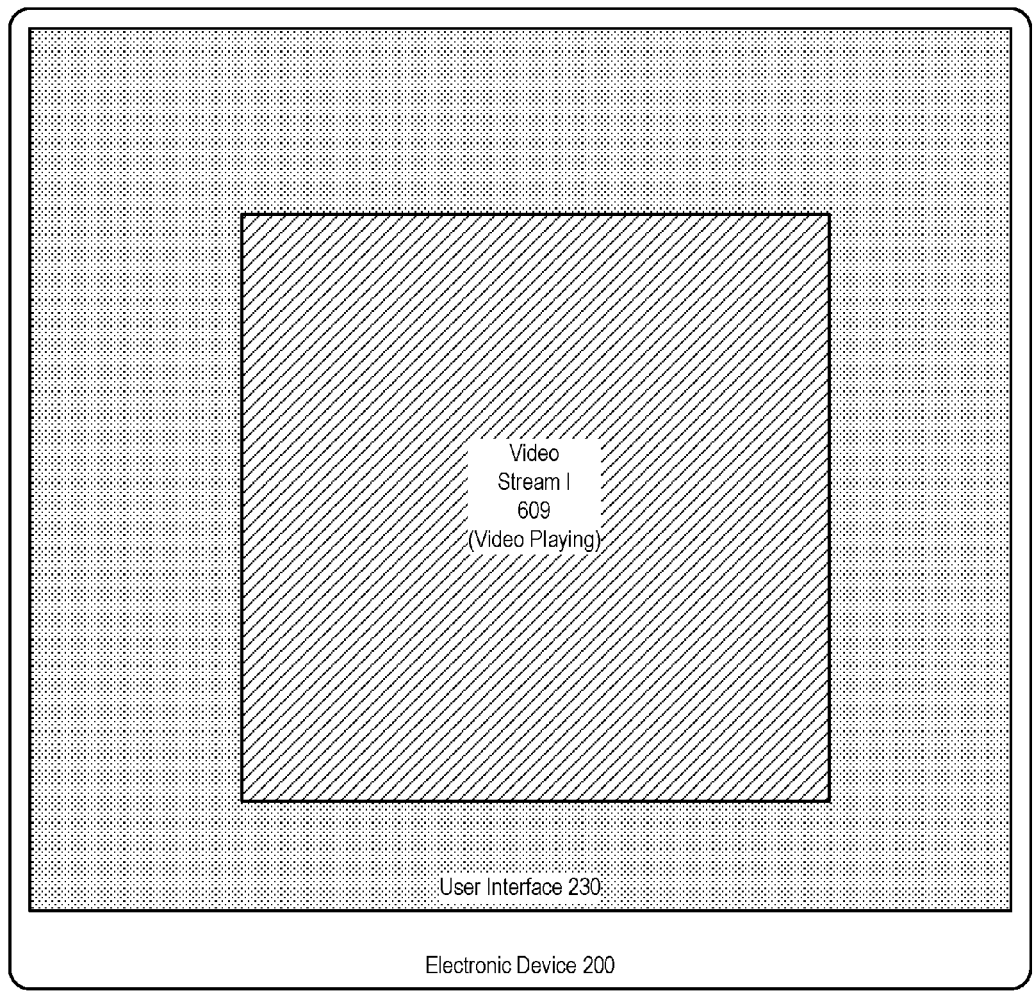

According to some embodiments, a timer or timer function may be used. For example, such timer or timer function may be set to a pre-buffering time $T_{pre-buffering}$ upon a user's selection 12 of a certain video stream, e.g. video stream I (609) in the example. The pre-buffering time $T_{pre-buffering}$ may be pre-determined. The exact time of the pre-buffering time $T_{pre-buffering}$ should preferably be tested an evaluated depending on the implementation, e.g. in view of user demands and/or system requirements. Advantageously, the pre-buffering time $T_{pre-buffering}$ should be selected to be sufficiently long in order for the electronic device 200 to be capable of beginning to play back a selected video stream without any unnecessary breaks. To this end, the pre-buffering time $T_{pre-buffering}$ may be 0.5 seconds, 1 second, 2 seconds, 3 seconds, 5 seconds, 7 seconds, 10 seconds, 15 seconds, 20 seconds, 30 seconds, etc. In preferred embodiments, the pre-buffering time $T_{pre-buffering}$ is less or equal to 5 seconds, i.e. $T_{pre-buffering} \leq 5$ seconds. The still image is displayed during the time the timer or timer function is running. More particularly, the zoom-out appearance (or, zoom-in appearance) of the still image, as illustrated in FIG. 3C, is displayed at the user interface 230 of the electronic device 200 until the pre-buffering time $T_{pre-buffering}$ set by the timer expires. With reference to FIG. 3D, in response to the pre-buffering time $T_{pre-buffering}$ set by the timer expiring, the electronic device 200 is configured to cease to display the zoomed-out (or, zoomed-in) appearance of the still image. Upon timer expiry, video content associated with the selected video stream (i.e., video stream I (609) in this example) begins to play at the user interface 230 of the electronic device. In other words, the electronic device 200 begins to play back the video content related to the selected video stream. By awaiting the play back of video content related to the selected video stream until the timer or timer function expires may contribute to an improved user experience.

Typically, a still image requires a short, or a very short, loading time to be displayed at a user interface 230. However, the playback of video content requires comparatively (much) longer loading times before it can be played back at the user interface 230. Using the streaming delivery technique proposed hereinabove, while the video stream (which typically requires the comparatively longer loading times) is being prepared for playback, its related video content may be pre-buffered, and this related video content may be used for displaying the still image (which requires a shorter loading time). This allows for a playback experience that, from the user's perception, seems immediate. During the pre-buffer time $T_{pre-buffering}$ the user 500 will experience a still image of the related video content and as soon as sufficient video content data has been loaded to begin playing back the video content, the still-image transitions into the video content being played back, see FIG. 3D. In other words, the described streaming delivery technique allows for the required loading time for playing the video content and, simultaneously, provide for an uninterrupted user experience, i.e. a user experience that (from the user's perception) seems immediate.

The described approach recognizes that that the zooming-out appearance (or, zooming-in appearance) of the still image allows for a smooth transition to the selected video content. The user may be presented with enough information about the selected video content so as to confirm his or her selection and, at the same time, the zooming-out appearance (or, zooming-in appearance) of the still image has the psychological effect that the user perceives the displayed zoomed-out (or, zoomed-in) still image as if the selected video content is already being played back when the still-image is being displayed. The smooth transition to the selected video content contributes to a playback experience that, from the user's perception, seems immediate and uninterrupted.

Figure 4A:
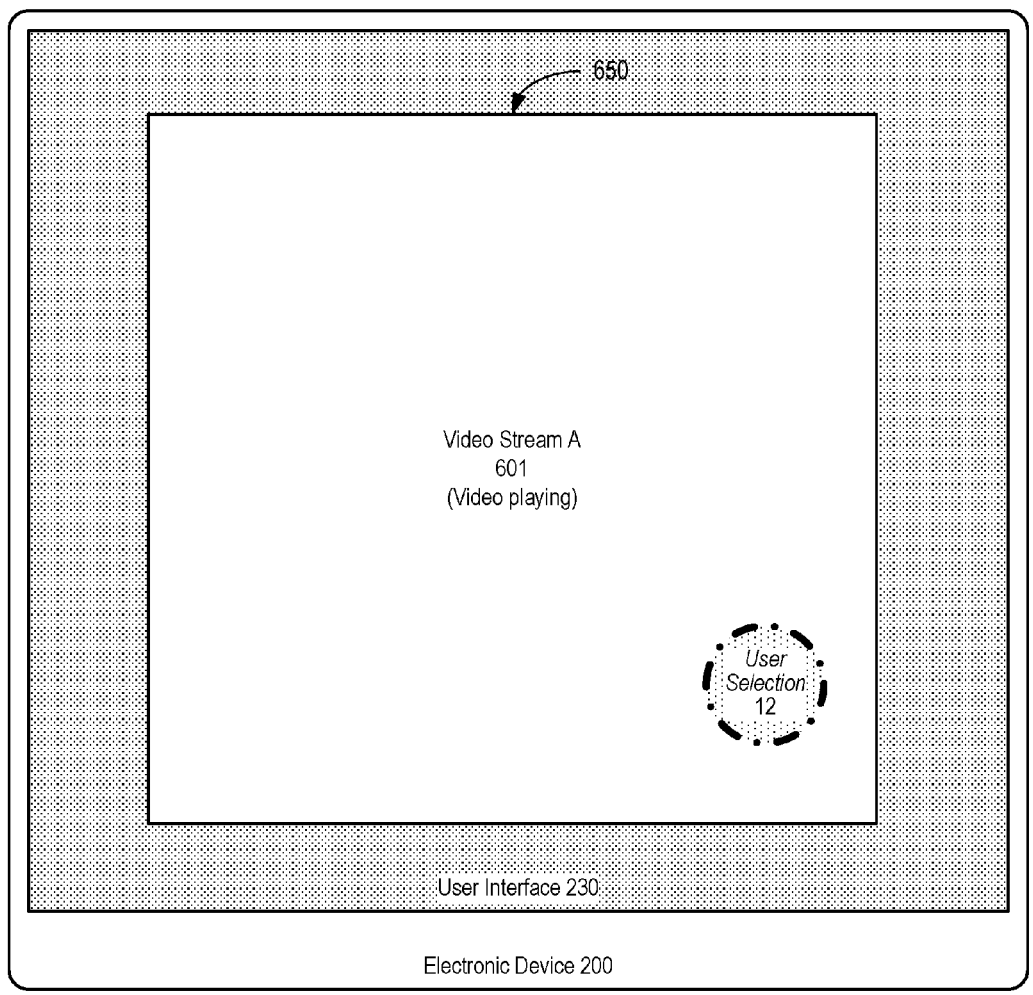
FIGS. 4A-4G illustrate another example of a user interface which supports playback of video content in accordance with an embodiment.
Figure 4B:
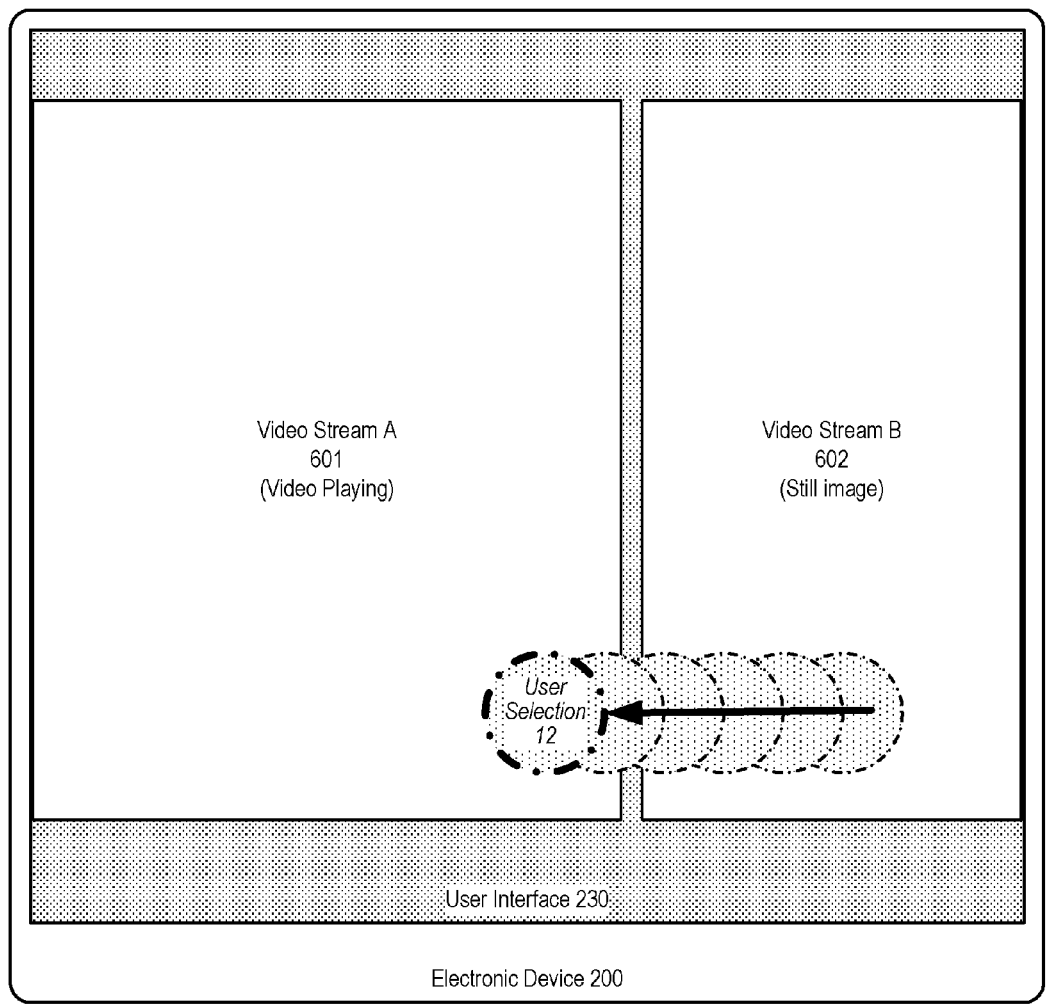
Figure 4C:
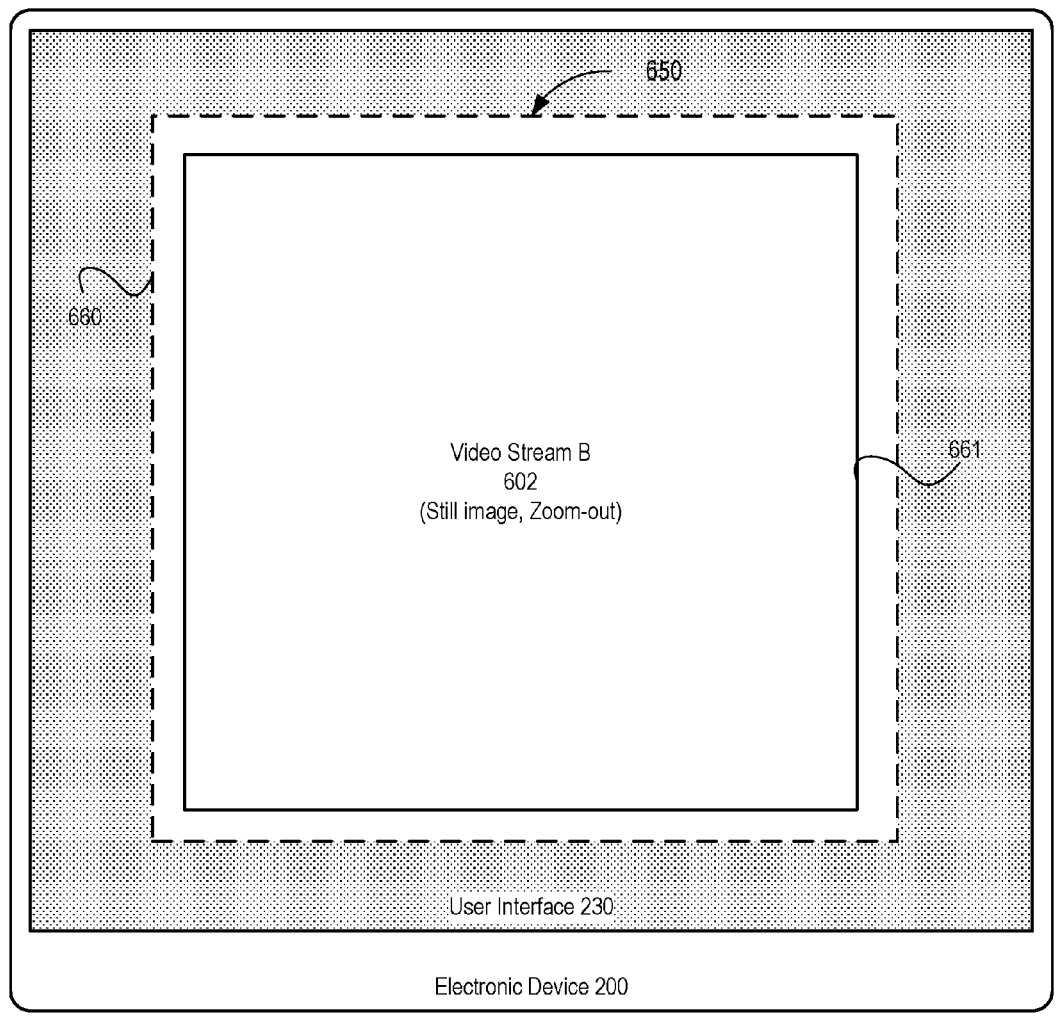

FIGS. 4A-4F illustrate an electronic device 200 with an exemplary user interface (e.g. a touch-sensitive user interface) which supports playback of video content, in accordance with another embodiment. In this example, upon a user selection 12 of video stream A (601) the electronic device 200 receives a request, or instruction, to play video content associated with video stream A (601) at the user interface 230 of the electronic device 200. The electronic device 200 may thus begin playing back the requested video content (see FIG. 4A). In some embodiments, the video stream A (601) corresponds to a channel (e.g. a television channel) of a sequence of several channels. As is schematically illustrated in FIG. 4A, the video content associated with video stream A (601) may be played in a video tile 650. With further reference to FIG. 4B, a user may e.g. perform a left-to-right swipe gesture such that a first portion of the user interface 230 that is left to the user's hand displays the first video stream A (601) while a second portion of the user interface 230 that is right to the user's hand displays another, e.g. adjacent, video stream B (602). This allows for a "swipe effect" transition where one video stream (i.e. video stream A, in this example) is swiped away to reveal another video stream (i.e. video stream B, in this example). As can be seen in FIG. 4B, the video content associated with video stream A (601) may still be playing at the user interface 230 during the left-to-right swipe gesture. For example, the video content associated with the video stream A (601) may continue to play as it slides off the display of the user interface (e.g. as shown in FIG. 4B). As will be appreciated, the above-mentioned left-to-right swipe gesture may be interpreted by the electronic device 200 to be a request, or instruction, to play video content associated with a video stream B (602) at the user interface 230. In some embodiments, the video stream B (602) corresponds to still another channel (e.g. a television channel) of the earlier-mentioned sequence of several channels. In response to receiving the above-mentioned request, i.e. upon a user selection 12 by means of the left-to-right swipe gesture, the pre-buffering logic 223 of the playback logic 222 starts pre-buffering data related to the selected video stream, i.e. video stream B (602) in this example. With further reference to FIG. 4C, while pre-buffering said data and before playing the video content associated with the selected video stream B (602) at the user interface 230, a still image corresponding to a portion of the second video content is displayed in a video tile 650 at a first size 660. Also, this first size 660 is adjusted, or otherwise re-sized, to a second size by means of zoom function 224 such that a zooming-out effect (or, alternatively a zooming-in effect) of the displayed still image is provided. In accordance with an embodiment, during a zooming-out, while the image is reduced in size, it can be simultaneously padded with additional image portions so that it continues to fill the video tile area; similarly, during a zooming-in, while the image is increased in size, it can be simultaneously cropped, so that it continues to fill the video tile area. The zoomed-out version of the still image is thus displayed within the video tile 650 while data related to the selected video stream B (602) is being pre-buffered.

Again, the still image may correspond to a certain portion of the selected video content. This portion of the selected video content may be pre-defined for the selected video content, such that a certain portion of the video content is always selected upon a user selection of the video content in question. In other words, the selection of still image may be static. Alternatively, the portion of the selected video content may be dynamically selected. For example, if the video content is associated with a live video stream of (e.g., a live soccer game) it may be more user-friendly if the still image corresponds to a portion of the live video stream. In some embodiments, it may be pre-configured that a certain portion which appears at a certain timing of the video stream should be selected for the still image.

Figure 4D:
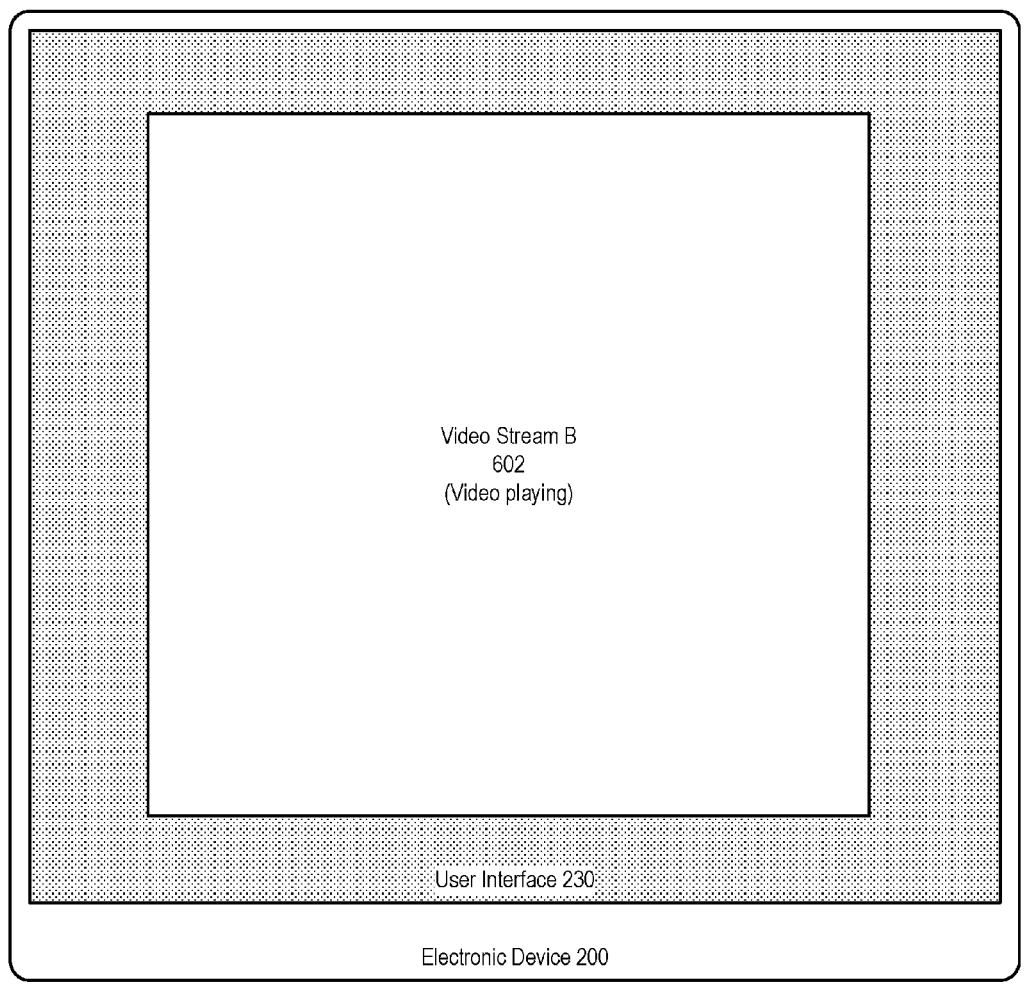

Similar to the embodiment described in connection with FIGS. 3A-3D, a timer or timer function may be used. For example, a timer or timer function may be set to a pre-buffering time $T_{pre-buffering}$ upon the user's selection 12 of a certain video stream, e.g. video stream B (602) in the example. The pre-buffering time $T_{pre-buffering}$ may be pre-determined. The exact time of the pre-buffering time $T_{pre-buffering}$ should preferably be tested an evaluated depending on the implementation, e.g. in view of user demands and/or system requirements. Advantageously, the pre-buffering time $T_{pre-buffering}$ should be selected to be sufficiently long in order for the electronic device 200 to be capable of beginning to play back a selected video stream without any unnecessary breaks. To this end, the pre-buffering time $T_{pre-buffering}$ may be 0.5 seconds, 1 second, 2 seconds, 3 seconds, 5 seconds, 7 seconds, 10 seconds, 15 seconds, 20 seconds, 30 seconds, etc. In preferred embodiments, the pre-buffering time $T_{pre-buffering}$ is less or equal to 10 seconds, i.e. $T_{pre-buffering} \leq 5$ seconds. The still image is displayed during the time the timer or timer function is running. More particularly, the zoom-out appearance (or, zoom-in appearance) of the still image, as illustrated in FIG. 4C, is displayed at the user interface 230 of the electronic device 200 until the pre-buffering time $T_{pre-buffering}$ set by the timer expires. With reference to FIG. 4D, in response to the pre-buffering time $T_{pre-buffering}$ set by the timer expiring, the electronic device 200 is configured to cease to display the zoomed-out (or, zoomed-in) appearance of the still image. Upon timer expiry, video content associated with the selected video stream (i.e., video stream B (602) in this example) begins to play within the video tile at the user interface 230 of the electronic device 200. In other words, the electronic device 200 begins to play back the video content related to the selected video stream. Again, by awaiting the play back of video content related to the selected video stream until the timer or timer function expires may contribute to an improved user experience.

Typically, a still image requires a relatively short loading time to be displayed at a user interface 230. However, the playback of video content requires comparatively longer loading times before it can be played back at the user interface 230 without interruptions. Using the streaming delivery technique proposed hereinabove, while the video stream is being prepared for playback, its related video content may be pre-buffered at the same time, and this related video content may be used for displaying the still image. This allows for a playback experience that, from the user's perception, seems immediate. During the pre-buffer time $T_{pre-buffering}$ the user 500 will experience a still image of the related video content and as soon as sufficient video content data has been loaded to begin playing back the video content, the still-image transitions into the video content being played back, see FIG. 4D. In other words, the described streaming delivery technique allows for the required loading time for playing the video content and, simultaneously, provide for an uninterrupted user experience, e.g. a user experience that (from the user's perception) seems immediate. To this end, the described approach recognizes that a zooming-out appearance (or, zooming-in appearance) of a still image of a portion of the selected video content may be particularly advantageous. More particularly, the described approach recognizes that the zooming-out appearance (or, zooming-in appearance) of the still image allows for a smooth transition to the selected video content. The user may be presented with enough information about the selected video content so as to confirm his or her selection and, at the same time, the zooming-out appearance (or, zooming-in appearance) of the still image has the psychological effect that the user perceives the displayed zoomed-out (or, zoomed-in) still image as if the selected video content is already being played back when the still-image is being displayed. In turn, this smooth transition to the selected video content contributes to the playback experience that, from the user's perception, seems immediate and uninterrupted when switching between video streams such as, for example, when channel surfing through various television channels.

Figure 4E:
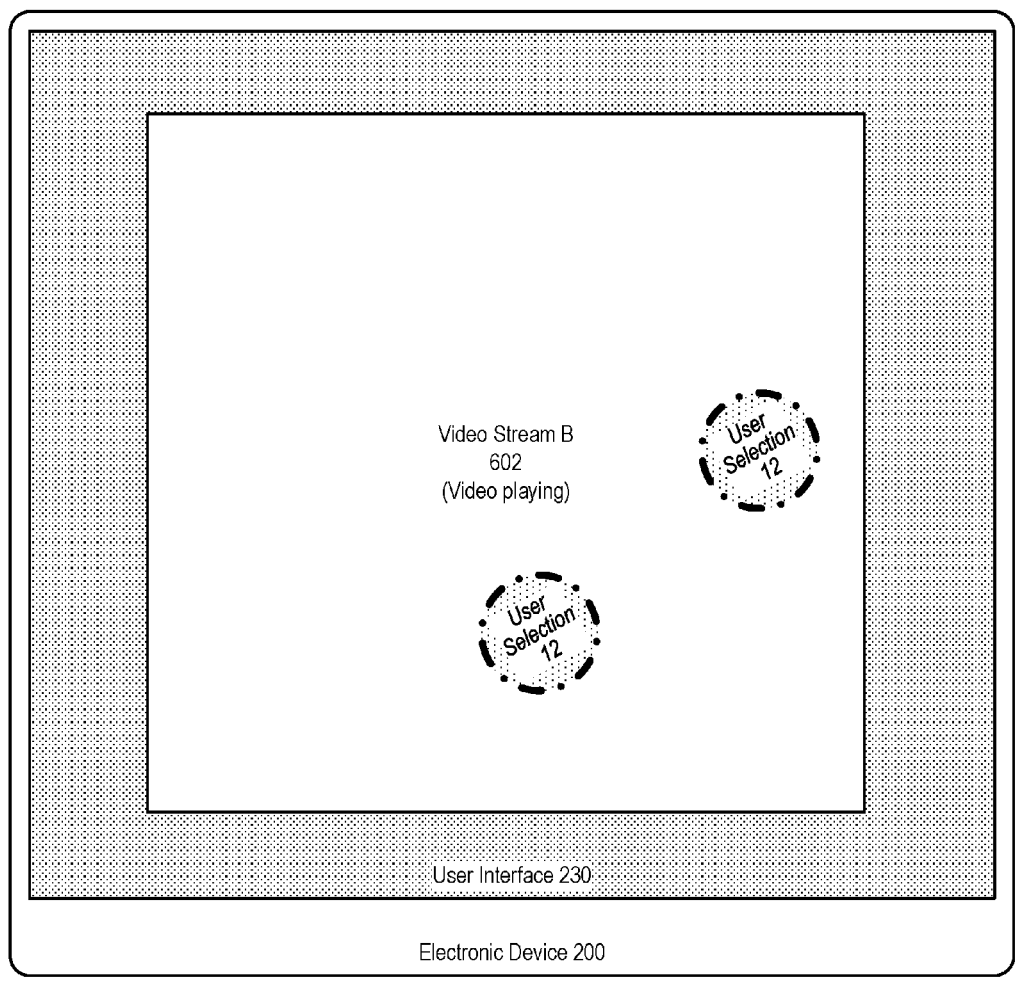
Figure 4F:
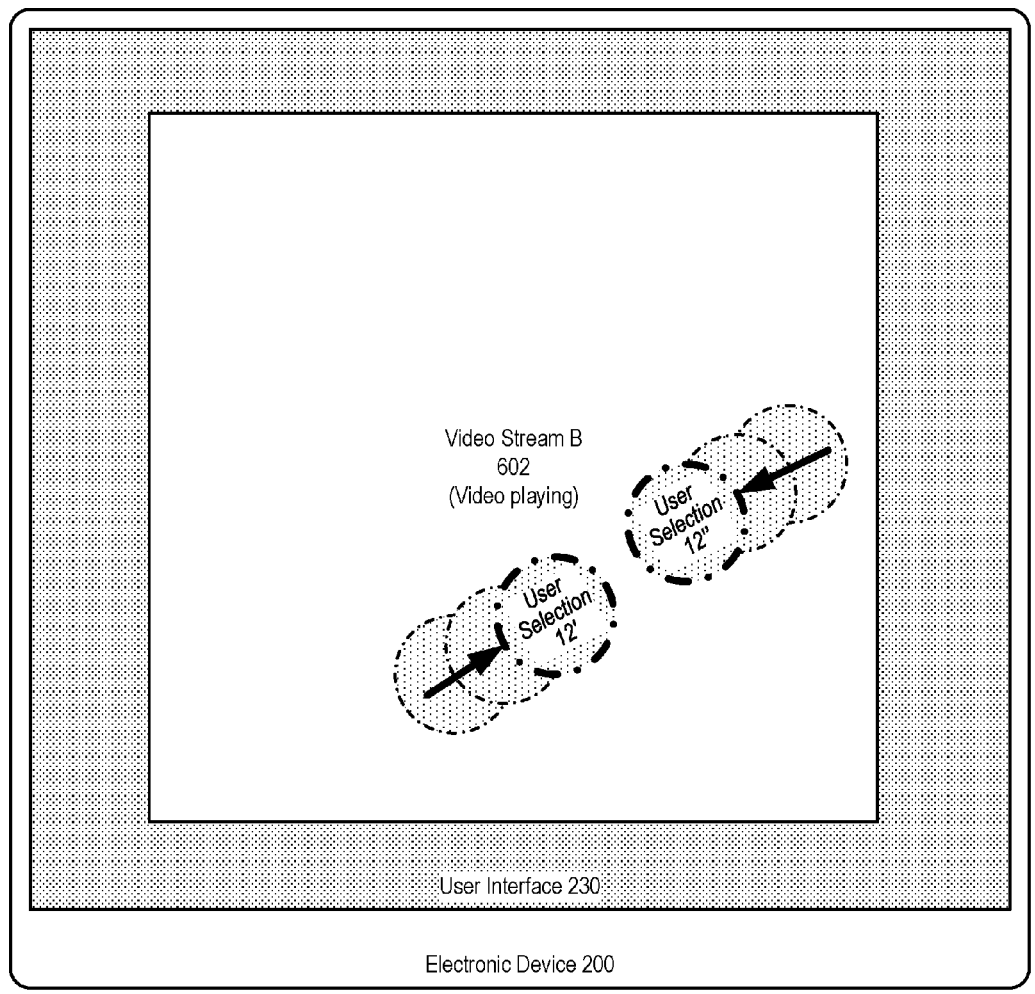
Figure 4G:
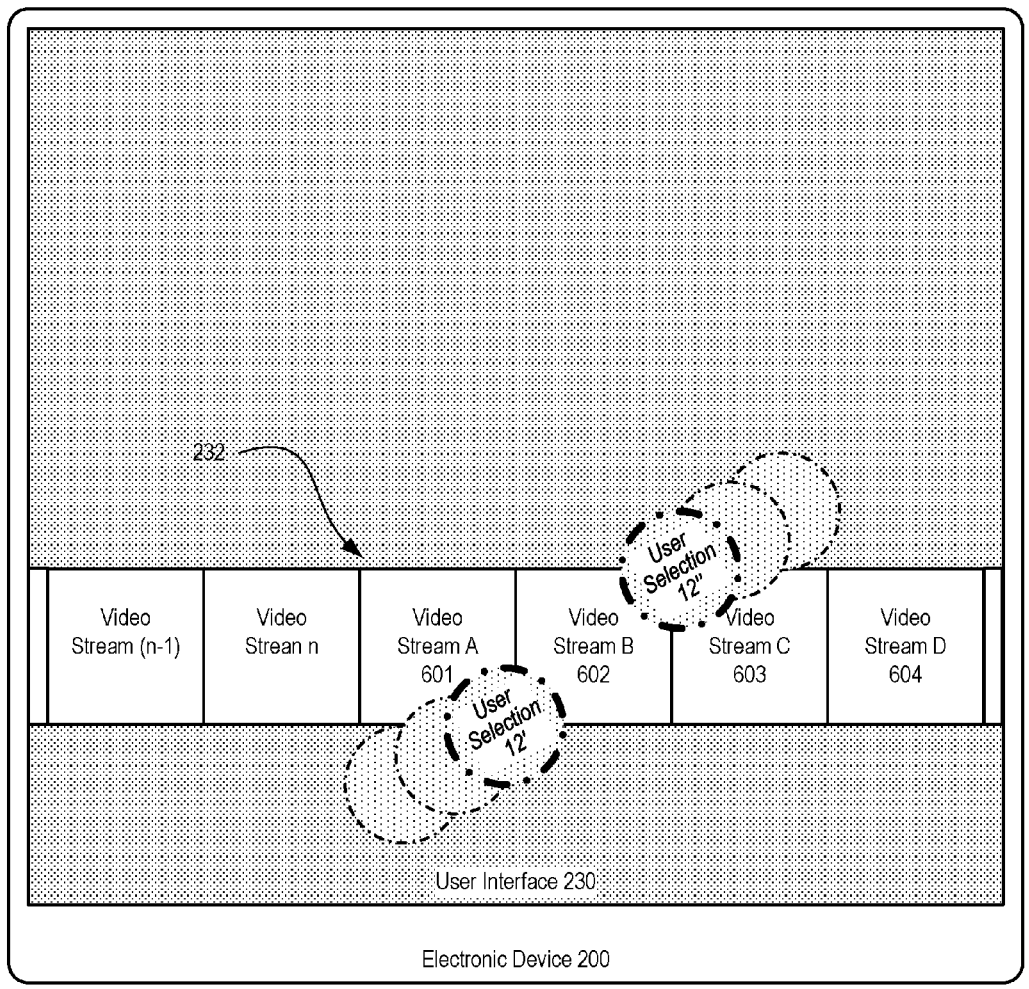

Turning now to FIGS. 4E-4G, optional further user interactions with the user interface are depicted. More particularly, FIGS. 4E-4G illustrate exemplary user interfaces for switching, or otherwise transitioning, between adjacent or non-adjacent playing back of video content (e.g. video channels or television channels) according to some embodiments.

While video content associated with video stream B (602) is being played back at the user interface 230, a first contact denoted 12' and a second contact denoted 12" are detected. In some embodiments, the electronic device 200 detects the first contact 12' and the second contact 12" moving closer together, as is shown in FIG. 4F. In some embodiments, the electronic device 200 causes the user interface to zoom out (e.g., as shown in FIG. 4G) to display one or more video tiles (e.g., video tiles comprising video stream A (601), video stream B (602), video stream C (603), video stream D (604), etcetera). In one example embodiment, all the video tiles (e.g., video tiles corresponding to video tiles comprising video stream A (601), video stream B (602), video stream C (603), video stream D (604), etcetera) are represented in an ordered list of video tiles and when display of a video tile (e.g., video stream B (602) as shown in FIG. 4G) zooms out, the plurality of video tiles (as is also shown in FIG. 4G) are shown to the user 500 in the order in which they are listed in the visual array of video options 232. In one example embodiment, when the plurality of video tiles are shown in the ordered list as is illustrated in FIG. 4G. Optionally, the list may be traversed in response to a swipe gesture at the user interface 230. The user 500 may hence swipe, or scroll, through the list of video tiles and select new video content associated with another video option/stream in accordance with his or her preferences.

Example Methods

Figure 5:
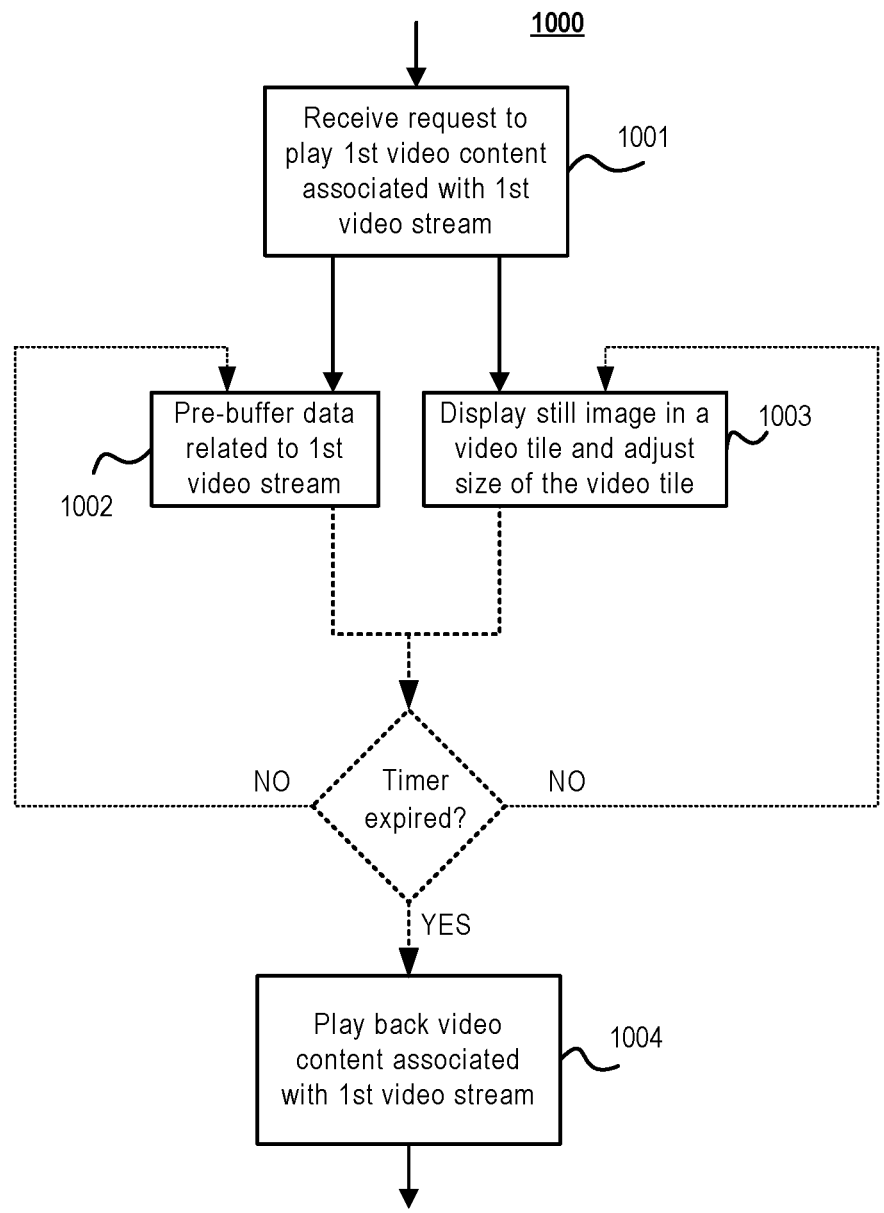
FIG. 5 illustrates a flowchart of a method according to an embodiment.

FIG. 5 illustrates an example method 1000 of operating an electronic device 200 for playback of video content according to embodiments herein. The method comprises receiving 1001 a first request to play first video content associated with a first video stream (e.g. video stream I as in the example in FIGS. 3A-3D) at a user interface 230 of the electronic device 200. In response to receiving the first request, data related to the first video stream is pre-buffered 1002. While said data is being pre-buffered, and before the first video content is played back 1004 at the user interface 230 of the electronic device 200, a still image corresponding to a portion of the first video content is displayed 1003 at the user interface. The still image is displayed 1003 in a first video tile having a first size. Also, this first size of the video tile is adjusted, or otherwise re-sized, to a second size such that a zooming-out, or zooming-in, effect of the displayed still image is provided.

In some embodiments, a timer or a timer function is set to a pre-buffering time $T_{pre-buffering}$ and the still image is displayed 1003 until the pre-buffering time $T_{pre-buffering}$ set by the timer expires as described earlier in this disclosure. Again, the pre-buffering time $T_{pre-buffering}$ may be pre-determined. In some embodiments, in response to the pre-buffering time $T_{pre-buffering}$ set by the timer expiring, the method additionally comprises ceasing to display the still image and beginning to play 1004 the first video content associated with the first video stream at the user interface 230 of the electronic device.

Figure 6:
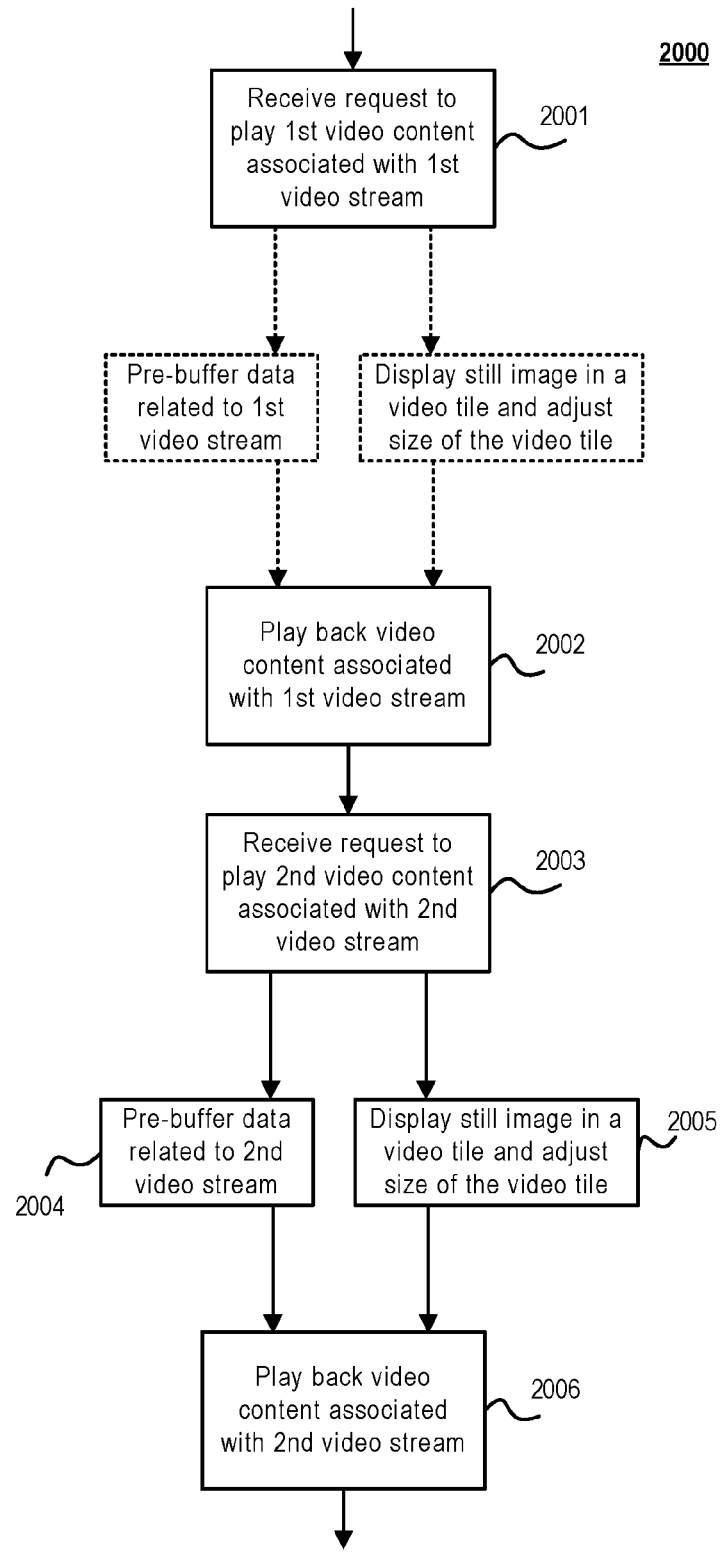
FIG. 6 illustrates a flowchart of a method according to another embodiment.

FIG. 6 illustrates another example method 2000 of operating an electronic device 200 for playback of video content. The method comprises receiving 2001 a first request to play first video content associated with a first video stream at a user interface 230 of the electronic device 200. The first video stream may correspond to a first channel (e.g., a video channel or a television channel) of a sequence of several channels. In response to receiving the first request, the first video content associated with the first video stream is played 2002 at the user interface 230 of the electronic device 200. Optionally, the step or action 2002 of playing back the first video content at the user interface 230 may be preceded by the same or similar actions, or steps, as described with reference to FIG. 5, i.e. while data related to the first video stream is being pre-buffered a still image corresponding to a portion of the first video content is displayed in a first video tile at a first size and this first size is adjusted, or otherwise modified, to a second size such that a zooming-out, or zooming-in, effect of the displayed still image is provided until the video content begins to play. While the first video content is played at the user interface (or, alternatively, after the first video content has been played), the method additionally comprises receiving 2003 a second request to play second video content associated with a second video stream at the user interface 230. The second video content is different from the first video content and, likewise, the second video stream is different from the first video stream. The second video stream may correspond to a second channel (e.g., a video channel or a television channel) of the earlier-mentioned sequence of several channels. In response to receiving the second request, data related to the second video stream is pre-buffered 2004. While the data related to the second video stream is being pre-buffered, and before the second video content is played back 2006 at the user interface 230 of the electronic device 200, a still image corresponding to a portion of the second video content is displayed 2005 at the user interface 230. The still image is displayed 2005 in a first video tile having a first size. Also, this first size of the video tile is adjusted, or otherwise re-sized, to a second size such that a zooming-out, or zooming-in, effect of the displayed still image is provided.

Although not schematically shown in FIG. 6, a timer or a timer function may be set to a pre-buffering time $T_{pre-buffering}$ and the still image is displayed 2005 until the pre-buffering time $T_{pre-buffering}$ set by the timer expires as described earlier in this disclosure. Again, the pre-buffering time $T_{pre-buffering}$ may be pre-determined. In some embodiments, in response to the pre-buffering time $T_{pre-buffering}$ set by the timer expiring, the method additionally comprises ceasing to display the still image and beginning to play 2006 the second video content associated with the second video stream at the user interface 230 of the electronic device 200.

It should be appreciated that, in some embodiments (see e.g. FIG. 4B), the method may comprise playing 2002 the first video content concurrently with displaying 2005 the still image corresponding to said portion of the second video content.

Example Implementations of Embodiments of the Electronic Device

Figure 7:
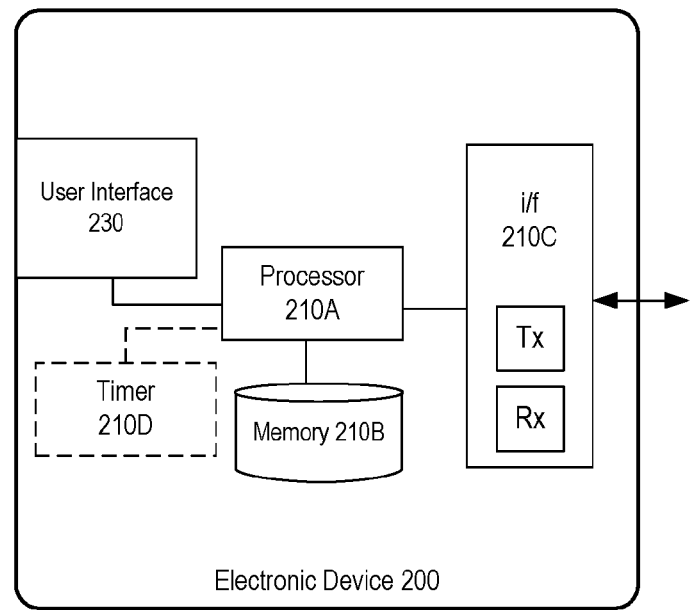
FIG. 7 illustrates an example implementation of an embodiment of an electronic device shown in FIGS. 1-4.

FIG. 7 illustrates an electronic device 200, which is suitable for playback of video content. The electronic device 200 is advantageously, but not necessarily, a tablet computer or a smart phone as described earlier with reference to FIG. 1. The electronic device 200 is configured to execute, or otherwise perform, the methods described throughout this disclosure.

As is schematically illustrated in FIG. 7, the electronic device 200 comprises hardware 210A-D. For example, the electronic device may comprise one or more processors 210A and one or more memories 210B. Also, a communications interface 210C may be provided in order to allow the electronic device 200 to communicate with other electronic devices and/or servers 300, e.g. via a network 400 such as the Internet. To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the electronic device 200 to communicate with other devices and/or servers 300 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Bluetooth®, etcetera. The electronic device may further comprise a user interface 230, which may be comprised of a display and a keypad. Advantageously, the user interface is a touch-sensitive user interface. As such, a display of the touch-sensitive user interface may be a touch screen display upon which virtual keys may be displayed and operated. Optionally, the electronic device 200 may additionally comprise a timer 210D, or a timer function.

As described with reference to FIG. 1, the electronic device 200 may comprise one or more applications, e.g. the media playback application 220. The applications are sets of instructions (e.g., computer program code) that when executed by the one or more processors 210A controls the operation of the electronic device 200.

In some implementations, the one or more memories 210B stores computer program code, which, when run in the one or more processors 210A causes the electronic device 200 to receive a first request to play first video content associated with a first video stream (e.g., video stream I (609) in the example of FIGS. 3A-3D) at the user interface 230, and in response to receiving the first request, pre-buffer data related to the first video stream (e.g., video stream I (609)); while pre-buffering said data and before playing the first video content at the user interface 230, display (at the user interface 230) a still image corresponding to a portion of the first video content in a first video tile at a first size, and adjust the first size to a second size such that a zooming-out, or zooming-in, effect of the displayed still image is provided.

In some implementations, the one or more memories 210B may additionally store computer program code, which, when run in the one or more processors 210A causes the electronic device 200 to set the timer 210D (or, a timer function) to a pre-buffering time $T_{pre-buffering}$ and to display the still image at the user interface 230 until the pre-buffering time $T_{pre-buffering}$ set by the timer expires. As described earlier, the pre-buffering time $T_{pre-buffering}$ may be pre-determined. In some implementations, the one or more memories 210B may store computer program code, which, when run in the one or more processors 210A causes the electronic device 200 to, in response to the pre-buffering time $T_{pre-buffering}$ set by the timer expiring: cease to display the still image; and begin to play the first video content associated with the first video stream at the user interface 230 of the electronic device 200.

In still other implementations, the one or more memories 210B stores computer program code, which, when run in the one or more processors 210A causes the electronic device 200 to: receive a first request to play first video content associated with a first video stream at the user interface 230, wherein the first video stream corresponds to a first channel of a sequence of several channels; in response to receiving the first request, play the first video content associated with a first video stream at the user interface 230; while playing the first video content at the user interface 230 of the electronic device 200 receive a second request to play second video content associated with a second video stream at the user interface 230, wherein the second video stream corresponds to a second channel of the sequence of several channels; in response to receiving the second request, pre-buffer data related to the second video stream; while pre-buffering said data and before playing the second video content at the user interface 230; display, at the user interface, a still image corresponding to a portion of the second video content in a second video tile at a first size, and adjust the first size to a second size such that a zooming-in, or zooming-out, effect of the displayed still image is provided.

The one or more memories 210B may also store computer program code, which, when run in the one or more processors 210A causes the electronic device 200 to set the timer 210D to a pre-buffering time $T_{pre-buffering}$ and to display the still image until the buffering time $T_{pre-buffering}$ set by the timer expires. The pre-buffering time $T_{pre-buffering}$ may be pre-determined. Advantageously, but not necessarily, the one or more memories 210B may store computer program code, which, when run in the one or more processors 210A causes the electronic device 200 to, in response to the pre-buffering time $T_{pre-buffering}$ set by the timer expiring: cease to display the still image and begin to play the second video content associated with the second video stream at the user interface 230 of the electronic device 200. In some implementations, the one or more memories 210B store computer program code, which, when run in the processor causes the electronic device 200 to play the first video content concurrently with displaying the still image at the user interface 230.

Example Computer-Readable Mediums

Figure 8:
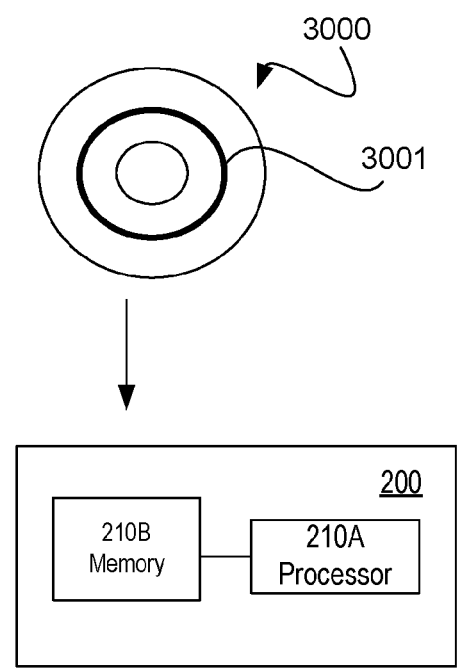
FIG. 8 illustrates an example of a computer-readable medium, in accordance with an embodiment.

Turning now to FIG. 8, another embodiment will be briefly discussed. FIG. 8 shows an example of a computer-readable medium, in this example in the form of a data disc 3000. In one embodiment the data disc 3000 is a magnetic data storage disc. The data disc 3000 is configured to carry instructions 3001 that when loaded into a processor 210A of an electronic device 200, executes a method or procedure according to the embodiments disclosed in this disclosure. The data disc 3000 is arranged to be connected to or within and read by a reading device (not shown), for loading the instructions into the processor. One such example of a reading device in combination with one (or several) data disc(s) 3000 is a hard drive. It should be noted that the computer-readable medium can also be other mediums such as compact discs, digital video discs, flash memories or other memory technologies commonly used. In such an embodiment the data disc 3000 is one type of a tangible computer-readable medium. The instructions may alternatively be downloaded to a computer data reading device, such as a computer or other electronic device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the electronic device 200. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method for use by an electronic device for playback of video content, comprising:
   displaying, at a user interface of an electronic device, an array of video options as video tiles,
   wherein the electronic device includes a media playback application that controls playback of video content received from a media server, for playback at the electronic device, and
   wherein each video option is associated with a respective video stream of video content receivable from the media server, for playback at the electronic device, and
   wherein selection of a video option causes a request to be communicated to the media server to return a corresponding video stream of video content;
   receiving, at the user interface, a request to play a video stream of video content associated with a particular video option;
   pre-buffering, at the electronic device, video content data received from the media server of the video stream associated with the particular video option, including setting a timer for pre-buffering the video content data;
   while the video content data associated with the particular video option is being pre-buffered by the electronic device, and before the video content is played at the electronic device, displaying, at the user interface, within an area of a video tile for the particular video option, a still image that corresponds to a portion of the video content associated with the particular video option;
   adjusting a displayed size of the still image, from a first size to a second size, within the video tile;
   displaying the still image, as adjusted in size from the first size to the second size, during a time period determined by the timer; and
   upon expiration of the timer, transitioning from displaying the still image, to playing the video stream of video content associated with the particular video option.

2. The method of claim 1, further comprising:
   setting the timer to a pre-buffering time; and
   displaying the still image until the pre-buffering time set by the timer expires.

3. The method of claim 2, wherein the pre-buffering time is pre-determined.

4. The method of claim 2, comprising, in response to the pre-buffering time set by the timer expiring:
   ceasing to display the still image; and
   beginning to play the video stream associated with the particular video option.

5. The method of claim 3, comprising, in response to the pre-buffering time set by the timer expiring:
   ceasing to display the still image; and
   beginning to play the video stream associated with the particular video option.

6. The method of claim 1,
   wherein a first video stream corresponds to a first channel of a plurality of channels;
   in response to receiving a first request, playing a first video stream of first video content;
   while playing the first video stream, receiving a second request to play a second video stream of second video content, wherein the second video stream corresponds to a second channel of the plurality of channels; and
   pre-buffering, at the electronic device, video content data received from the media server of the second video stream, including
      displaying, at the user interface, a second video tile including, within an area of the second video tile, a still image that corresponds to a portion of the second video content; and
      adjusting a displayed size of the still image that corresponds to the portion of the second video content, from a first size to a second size, including one of padding or cropping the still image to fill the area of the second video tile.

7. An electronic device for playback of video content, the electronic device comprising:
   a user interface;
   a processor; and
   a memory storing computer program code, which, when executed by the processor causes the electronic device to:
   display, at a user interface of an electronic device, an array of video options as video tiles,
   wherein the electronic device includes a media playback application that controls playback of video content received from a media server, for playback at the electronic device, and
   wherein each video option is associated with a respective video stream of video content receivable from the media server, for playback at the electronic device, and wherein selection of a video option causes a request to be communicated to the media server to return a corresponding video stream of video content;

receive, at the user interface, a request to play a video stream of video content associated with a particular video option;

pre-buffer, at the electronic device, video content data received from the media server of the video stream associated with the particular video option, including setting a timer for pre-buffering the video content data;

while the video content data associated with the particular video option is being pre-buffered by the electronic device, and before the video content is played at the electronic device, display, at the user interface, within an area of a video tile for the particular video option, a still image that corresponds to a portion of the video content associated with the particular video option;

adjust a displayed size of the still image, from a first size to a second size, within the video tile;

display the still image, as adjusted in size from the first size to the second size, during a time period determined by the timer; and upon expiration of the timer, transitioning from displaying the still image, to playing the video stream of video content associated with the particular video option.

8. The electronic device of claim 7, further comprising:
setting the timer to a pre-buffering time; and
displaying the still image until the pre-buffering time set by the timer expires.

9. The electronic device of claim 8, wherein the pre-buffering time is pre-determined.

10. The electronic device of claim 8, comprising, in response to the pre-buffering time set by the timer expiring:
ceasing to display the still image; and
beginning to play the video stream associated with the particular video option.

11. The electronic device of claim 9, comprising, in response to the pre-buffering time set by the timer expiring:
ceasing to display the still image; and
beginning to play the video stream associated with the particular video option.

12. The electronic device of claim 7,
wherein a first video stream corresponds to a first channel of a plurality of channels;
in response to receiving a first request, playing a first video stream of first video content;
while playing the first video stream, receiving a second request to play a second video stream of second video content, wherein the second video stream corresponds to a second channel of the plurality of channels; and
pre-buffering, at the electronic device, video content data received from the media server of the second video stream, including
displaying, at the user interface, a second video tile including, within an area of the second video tile, a still image that corresponds to a portion of the second video content; and
adjusting a displayed size of the still image that corresponds to the portion of the second video content, from a first size to a second size, including one of padding or cropping the still image to fill the area of the second video tile.

13. A non-transitory computer readable storage medium, including instructions stored thereon which when read and executed by one or more processors perform a method comprising:

displaying, at a user interface of an electronic device, an array of video options as video tiles, wherein the electronic device includes a media playback application that controls playback of video content received from a media server, for playback at the electronic device, and wherein each video option is associated with a respective video stream of video content receivable from the media server, for playback at the electronic device, and wherein selection of a video option causes a request to be communicated to the media server to return a corresponding video stream of video content;

receiving, at the user interface, a request to play a video stream of video content associated with a particular video option;

pre-buffering, at the electronic device, video content data received from the media server of the video stream associated with the particular video option, including setting a timer for pre-buffering the video content data;

while the video content data associated with the particular video option is being pre-buffered by the electronic device, and before the video content is played at the electronic device, displaying, at the user interface, within an area of a video tile for the particular video option, a still image that corresponds to a portion of the video content associated with the particular video option;

adjusting a displayed size of the still image, from a first size to a second size, within the video tile;

displaying the still image, as adjusted in size from the first size to the second size, during a time period determined by the timer; and upon expiration of the timer, transitioning from displaying the still image, to playing the video stream of video content associated with the particular video option.

14. The non-transitory computer readable storage medium of claim 13, further comprising:
setting the timer to a pre-buffering time; and
displaying the still image until the pre-buffering time set by the timer expires.

15. The non-transitory computer readable storage medium of claim 14, wherein the pre-buffering time is pre-determined.

16. The non-transitory computer readable storage medium of claim 14, comprising, in response to the pre-buffering time set by the timer expiring:
ceasing to display the still image; and
beginning to play the video stream associated with the particular video option.

17. The non-transitory computer readable storage medium of claim 15, comprising, in response to the pre-buffering time set by the timer expiring:
ceasing to display the still image; and
beginning to play the video stream associated with the particular video option.

18. The non-transitory computer readable storage medium of claim 13,
wherein a first video stream corresponds to a first channel of a plurality of channels;
in response to receiving a first request, playing a first video stream of first video content;
while playing the first video stream, receiving a second request to play a second video stream of second video content, wherein the second video stream corresponds to a second channel of the plurality of channels; and pre-buffering, at the electronic device, video content data received from the media server of the second video stream, including
   displaying, at the user interface, a second video tile including, within an area of the second video tile, a still image that corresponds to a portion of the second video content; and
   adjusting a displayed size of the still image that corresponds to the portion of the second video content, from a first size to a second size, including one of padding or cropping the still image to fill the area of the second video tile.

\* \* \* \* \*